United States Patent
Suh

(10) Patent No.: US 12,353,982 B2
(45) Date of Patent: Jul. 8, 2025

(54) CONVOLUTION BLOCK ARRAY FOR IMPLEMENTING NEURAL NETWORK APPLICATION AND METHOD USING THE SAME, AND CONVOLUTION BLOCK CIRCUIT

(71) Applicant: GENESYS LOGIC, INC., New Taipei (CN)

(72) Inventor: Woon-Sik Suh, New Taipei (CN)

(*) Notice: Subject to any disclaimer, the term of this patent is extended or adjusted under 35 U.S.C. 154(b) by 1003 days.

(21) Appl. No.: 17/291,309

(22) PCT Filed: Apr. 30, 2019

(86) PCT No.: PCT/CN2019/085197
§ 371 (c)(1),
(2) Date: May 5, 2021

(87) PCT Pub. No.: WO2020/093669
PCT Pub. Date: May 14, 2020

(65) Prior Publication Data
US 2022/0027714 A1 Jan. 27, 2022

Related U.S. Application Data

(60) Provisional application No. 62/756,095, filed on Nov. 6, 2018.

(51) Int. Cl.
*G06N 3/063* (2023.01)
*G06F 1/03* (2006.01)
(Continued)

(52) U.S. Cl.
CPC ............ *G06N 3/063* (2013.01); *G06F 1/03* (2013.01); *G06F 7/50* (2013.01); *G06F 7/523* (2013.01);
(Continued)

(58) Field of Classification Search
CPC ... G06F 1/03; G06F 7/50; G06F 7/523; G06F 7/53; G06F 7/5443; G06F 9/54;
(Continued)

(56) References Cited

U.S. PATENT DOCUMENTS

10,049,323 B1 8/2018 Kim et al.
10,394,929 B2 8/2019 Tsai et al.
(Continued)

FOREIGN PATENT DOCUMENTS

CN 103985083 A 8/2014
CN 106779060 A 5/2017
(Continued)

OTHER PUBLICATIONS

Han et al., "Based on the neural network processing system and processing method for production line", published on Mar. 30, 2018, Document ID: CN-10786374-A, pp. 11 (Year: 2018).*
(Continued)

*Primary Examiner* — Chau T Nguyen

(57) ABSTRACT

A convolution block array for implementing neural network application, a method using the same, and a convolution block circuit are provided. The convolution block array includes a plurality of convolution block circuits configured to process a convolution operation of the neural network application, wherein each of the convolution block circuits comprises: a plurality of multiplier circuits configured to perform the convolution operation; and at least one adder circuit connected to the plurality of multiplier circuits and configured to perform an adding operation of results of the convolution operation and generate an output signal; where at least one of the convolution block circuits is configured to perform a biasing operation of the neural network application.

9 Claims, 6 Drawing Sheets

(51) Int. Cl.

| | | |
|---|---|---|
| *G06F 7/50* | (2006.01) | |
| *G06F 7/523* | (2006.01) | |
| *G06F 7/53* | (2006.01) | |
| *G06F 7/544* | (2006.01) | |
| *G06F 9/54* | (2006.01) | |
| *G06N 3/048* | (2023.01) | |
| *G06N 3/08* | (2023.01) | |

(52) U.S. Cl.
CPC .............. *G06F 7/53* (2013.01); *G06F 7/5443* (2013.01); *G06F 9/54* (2013.01); *G06N 3/048* (2023.01); *G06N 3/08* (2013.01)

(58) Field of Classification Search
CPC ........ G06N 3/045; G06N 3/048; G06N 3/063; G06N 3/08
See application file for complete search history.

(56) References Cited

U.S. PATENT DOCUMENTS

| 11,803,738 B2 | 10/2023 | Martin | |
|---|---|---|---|
| 2018/0129935 A1 | 5/2018 | Kim et al. | |
| 2018/0232621 A1 | 8/2018 | Du et al. | |
| 2018/0307980 A1* | 10/2018 | Barik | G06N 3/063 |
| 2019/0266485 A1* | 8/2019 | Singh | G06N 3/063 |
| 2019/0294413 A1* | 9/2019 | Vantrease | G06N 3/063 |

FOREIGN PATENT DOCUMENTS

| CN | 106845635 A | 6/2017 | | |
|---|---|---|---|---|
| CN | 107633297 A | 1/2018 | | |
| CN | 107844826 A | 3/2018 | | |
| CN | 107862374 A | 3/2018 | | |
| CN | 108171317 A | 6/2018 | | |
| CN | 108205701 A | 6/2018 | | |
| CN | 108229671 A | 6/2018 | | |
| EP | 3396534 A2 * | 10/2018 | ............. | G06F 16/17 |
| GB | 201718358 A | 12/2017 | | |
| TW | 201830232 A | 8/2018 | | |

OTHER PUBLICATIONS

Gu et al., "For A Convolutional Neural Network-convolution Operation And Full Connection Arithmetic Circuit", published on Nov. 6, 2018, Document ID: CN 108764467 A, pp. 24. (Year: 2018).*

Chris Martin, "Development Of Sparsity In The Neural Network", published on Jul. 26, 2019, but filed on Nov. 6, 2018, Document ID: CN 110059798 A, pp. 29. (Year: 2018).*

Wang Xiaofeng:"Design of FPGA accelerator with high parallelism for convolution neural network";Journal of Computer Applications;2021, 41(3):812-819;CN.

Wang Kun:"Convolutional neural network system design and hardware implementation in deep learning";Technology Application Issue 5, 2018;School of Big Data and Information Engineering, Guizhou University, Guiyang, Guizhou 550025;CN;May 24, 2018.

Yufei Ma : "Optimizing the Convolution Operation to Accelerate Deep Neural Networks on FPGA",IEEE Transactions on Very Large Scale Integration (VLSI) Systems, vol. 26, No. 7, Jul. 2018;17875392;10.1109/TVLSI.2018.2815603;Apr. 3 Mar. 2018 Apr. 2018.

Haruyoshi Yonekawa : "On-chip Memory Based Binarized Convolutional Deep Neural Network Applying Batch Normalization Free Technique on an FPGA",2017 IEEE International Parallel and Distributed Processing Symposium Workshops;;17011969;10.1109/IPDPSW.2017.95;Lake Buena Vista, FL, USA;;Jun. 2, 2017.

* cited by examiner

CONVOLUTION BLOCK ARRAY FOR IMPLEMENTING NEURAL NETWORK APPLICATION AND METHOD USING THE SAME, AND CONVOLUTION BLOCK CIRCUIT

FIELD OF DISCLOSURE

The present disclosure relates to the field of neural network application, and more particularly to a convolution block array for implementing neural network application and method using the same.

BACKGROUND

Artificial neural networks (NNs) refer to a computational modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzman Machines, etc. In a feedforward neural network, the neurons of the neural network have links to other neurons. The links only extend in one direction, i.e., the forward direction, through the neural network.

A neural network may be used to extract "features" from complex input data. The neural network may include a plurality of layers. Each layer may receive input data and generate output data by processing the input data to the layer. The output data may be a feature map of the input data that the neural network generates by convolving an input image or a feature map with convolution kernels.

A convolution block of neural network (NN) is a main core of a convolution neural network (CNN) acceleration. In order to implement operations of the convolution block in hardware, a biasing operation must be performed after final filter operation. However, it was difficult to implement the hardware for the biasing operation of an output of the hardware according to a combination of bits of the convolution. The existing method is implemented by an adder circuit operation through an external adder circuit and an external memory. The method makes it easy to understand the mechanics of CNN operations of the hardware. However, it requires hardware resources and memory operations for the biasing operation.

Accordingly, it is necessary to provide a convolution block for implementing neural network application and method using the same to solve the technical problems in the prior art.

SUMMARY OF THE DISCLOSURE

In order to solve technical problems mentioned above, an object of the present disclosure is to provide a convolution block array for implementing neural network application and method using the same. The convolution block array of the present disclosure can support various bit sizes, and the operation of adding the biasing coefficient can be performed by the convolution block array without using an additional adder circuit.

In order to achieve the object described above, the present disclosure provides a convolution block array for implementing a neural network application, comprising: a plurality of convolution block circuits configured to process a convolution operation of the neural network application, wherein each of the convolution block circuits comprising: a plurality of multiplier circuits configured to perform the convolution operation; and at least one adder circuit connected to the plurality of multiplier circuits and configured to perform an adding operation of results of the convolution operation and generate an output signal; wherein at least one of the convolution block circuits is configured to perform a biasing operation of the neural network application.

In one preferred embodiment of the present disclosure, each of the convolution block circuits comprises four multiplier circuits, a first convolution adder circuit, a second convolution adder circuit, and a block adder circuit; wherein two multiplier circuits of the four multiplier circuits are connected to the first convolution adder circuit, and another two multiplier circuits of the four multiplier circuits are connected to the second convolution adder circuit, and the block adder circuit is connected to the first convolution adder circuit and the second convolution adder circuit.

In one preferred embodiment of the present disclosure, the convolution block further comprises a latch connected to the at least one adder circuit and also connected to at least one downstream convolution block circuit; wherein the latch is configured to transmit the output signal to the at least one downstream convolution block circuit or fed the output signal back to the at least one adder circuit.

In one preferred embodiment of the present disclosure, the convolution block array further comprises: a plurality of multiplexers connected to the plurality of multiplier circuits respectively, wherein the multiplier circuits are connected to the at least one adder circuit via respective multiplexer; and a path controller connected to the plurality of multiplexers and also connected to at least one upstream convolution block circuit, wherein when a corresponding path of the path controller is enabled, an output signal from the at least one upstream convolution block circuit transmits to the at least one adder circuit via the path controller.

In one preferred embodiment of the present disclosure, the convolution operation is executed by multiplying feature values by weight coefficients and adding a biasing coefficient.

The present disclosure also provides a method of implementing neural network application in a convolution block array, wherein the convolution block array comprising a plurality of convolution block circuits, and each of the convolution block circuits comprises a plurality of multiplier circuits and at least one adder circuit, and the method comprises:

S10, assigning a set of convolution block circuits in a first dimension to process a convolution operation of the neural network application;

S20, inputting a control signal to the set of convolution block circuits for controlling the set of convolution block circuits to perform M×M filter window involving N-bit based convolution operation, wherein M is an odd number and N is an integer greater than one;

S30, inputting feature values and filter values to the set of convolution block circuits;

S40, performing an N-bit multiplication function with the feature values and the filter values corresponding values of input images by the multiplier circuits of the convolution block circuit;

S50, adding results from the multiplier circuits by the at least one adder circuit; and S60, generate a convolution output signal.

In one preferred embodiment of the present disclosure, the step S10 comprises: according to a combination of the M×M filter window and the N-bit of the convolution operation, determine use a number of the convolution block circuits for performing the convolution operation of one pixel of the convolution block circuits, and the number of the convolution block circuits arranged in a line based.

In one preferred embodiment of the present disclosure, the filter values of one pixel comprises weight coefficients and a biasing coefficient, and in a last convolution block circuit for performing convolution operation of each pixel, the biasing coefficient passes to the at least one adder circuit through an idle multiplier circuit of the plurality of multiplier circuits of the last convolution block circuit.

In one preferred embodiment of the present disclosure, after the step S50, the method comprises:

S51, adding the results by the at least one adder circuit of each convolution block circuit to generate a partial output signal;

S52, transmitting all of partial output signals to the last convolution block circuit;

S53, adding the all of partial output signals by the at least one adder circuit of the last convolution block circuit, and generating the convolution output signal representing one pixel.

In one preferred embodiment of the present disclosure, each of the convolution block circuits comprises a latch connected to the at least one adder circuit and also connected to the last convolution block circuit, and wherein after the step S51, the last convolution block circuit temporarily stores the partial output signal in the latch, and then in the step S52, the last convolution block circuit feeds the partial output signal back to its the at least one adder circuit.

The present disclosure also provides a convolution block circuit, comprising: four multiplier circuits configured to perform a M×M filter window involving N-bit based convolution operation; a first convolution adder circuit connected to two multiplier circuits of the four multiplier circuits and configured to add results of the convolution operation from the two multiplier circuits; a second convolution adder circuit connected to another two multiplier circuits of the four multiplier circuits and configured to add results of the convolution operation from the two multiplier circuits; a block adder circuit connected to the first convolution adder circuit and the second convolution adder circuit and configured to perform a first adding operation and a second adding operation, wherein in the first adding operation, the block adder circuit adds results of partial convolution operations from the first convolution adder circuit and the second convolution adder circuit and a biasing coefficient, and generates a first convolution value, wherein the biasing coefficient transmits to the block adder circuit through an idle multiplier circuit of the four multiplier circuits; and a latch connected to the block adder circuit and configured to fed the first convolution value back to the block adder circuit; wherein in response to the block adder circuit receive the first convolution value and other partial output signals from upstream convolution block circuits, the block adder circuit performs the second adding operation to add the first convolution value and the other partial output signals, and generates a convolution output signal.

In comparison to prior art, when the CNN algorithm is implemented in hardware, even if the CNN algorithm is not equipped with any hardware for biasing operation, the filter size of all two-dimensional convolutions is odd. Therefore, the present disclosure provides a convolution block circuit to be composed of four multiplier circuits. The result of the multiplication of the remaining pixel is input to the unused adder circuit input of the last portion of the necessary convolution block circuit of the convolution block array according combination of the filter size and the bit size of the convolution operation. Finally, by giving the biasing value to the empty filter input, by this design, we can get the result of running all the successes except activation. This saves hardware resources and eliminates the need for separate memory operations, thereby improving performance.

DETAILED DESCRIPTION

The structure and the technical means adopted by the present disclosure to achieve the above and other objects can be best understood by referring to the following detailed description of the preferred embodiments and the accompanying drawings.

Figure 1:
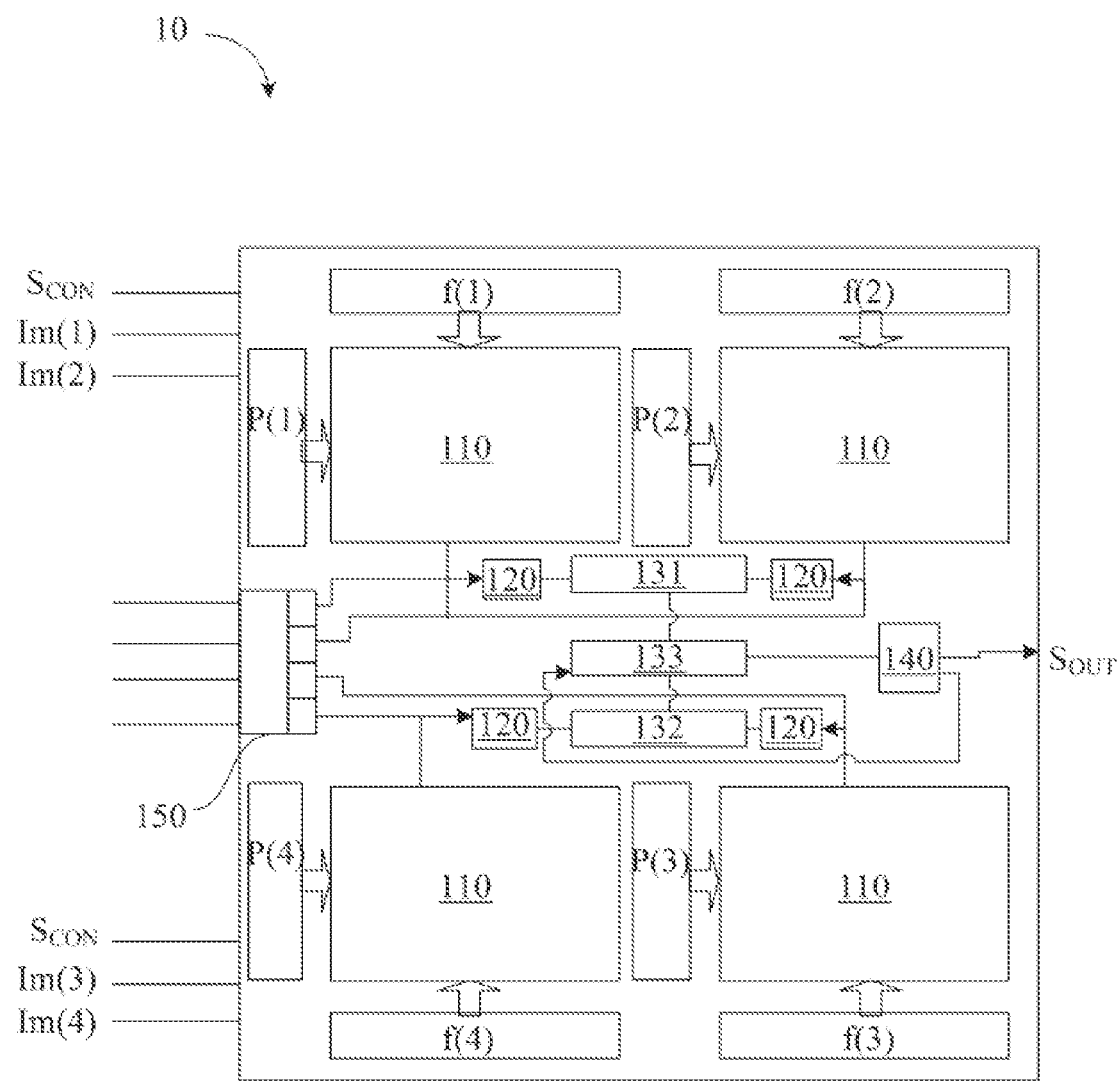
FIG. 1 shows a schematic diagram of a convolution block circuit according to a preferred embodiment of the present disclosure.

Referring to FIG. 1, which shows a schematic diagram of a convolution block circuit 10 according to a preferred embodiment of the present disclosure. The convolution block circuit 10 includes four multiplier circuits 110, four multiplexers 120, a first convolution adder circuit 131, a second convolution adder circuit 132, a block adder circuit 133, a latch 140, and a path controller 150. The multiplier circuits are configured to perform a convolution operation of a neural network application. Each of the multiplier circuits 110 is connected to one of the multiplexers 120, and two multiplier circuits 110 are connected to the first convolution adder circuit 131 via respective multiplexer 120. Also, the other two multiplier circuits 110 are connected to the second convolution adder circuit 132 via respective multiplexer 120. Moreover, the first convolution adder circuit 131 and the second convolution adder circuit 132 are connected to the block adder circuit 133. The latch 140 is connected to downstream convolution block circuits and also connected to the block adder circuit 133. The path controller 150 is connected to upstream convolution block circuits, and is also connected to the four multiplexers 120.

In the present disclosure, the convolution block circuit 10 may be fabricated on an integrated circuit (IC) including a controller and a memory. As shown in FIG. 1, the controller of the IC may inputs control signals $S_{CON}$ to the convolution block circuit 10 and fed input images Im(1)-Im(4) into the convolution block circuit 10, so as to control the convolution block circuit 10 performing a convolution operation with feature values P(1)-P(4) and filter values f(1)-f(4), including weight coefficients and/or a biaings coefficient, corresponding the input images Im(1)-Im(4), thereby outputting an output signal $S_{OUT}$, where the values of the input images Im(1)-Im(4) may be stored in the memory of the IC. In the present disclosure, the latch 140 may transmit the output signal $S_{OUT}$ to the downstream convolution block circuits, or may feed the output signal $S_{OUT}$ back to the block adder circuit 133 of the convolution block circuit 10. Furthermore, the path controller 150 may receive output signals $S_{OUT}$ from the upstream convolution block circuits and pass them to the corresponding adder circuits. It can be understand that various operations of the convolution block circuit 10 can be controlled by the controller of the IC. That is, all or part of the process of implementing the convolution block circuit 10 can be completed by a computer program to instruct related hardware (such as a processor, controller, etc.). The program may be saved in a computer readable storage medium, and the program may include the flow of embodiments of the methods described above and below when executed. The storage medium described therein may be a storage or the like.

Figure 2:
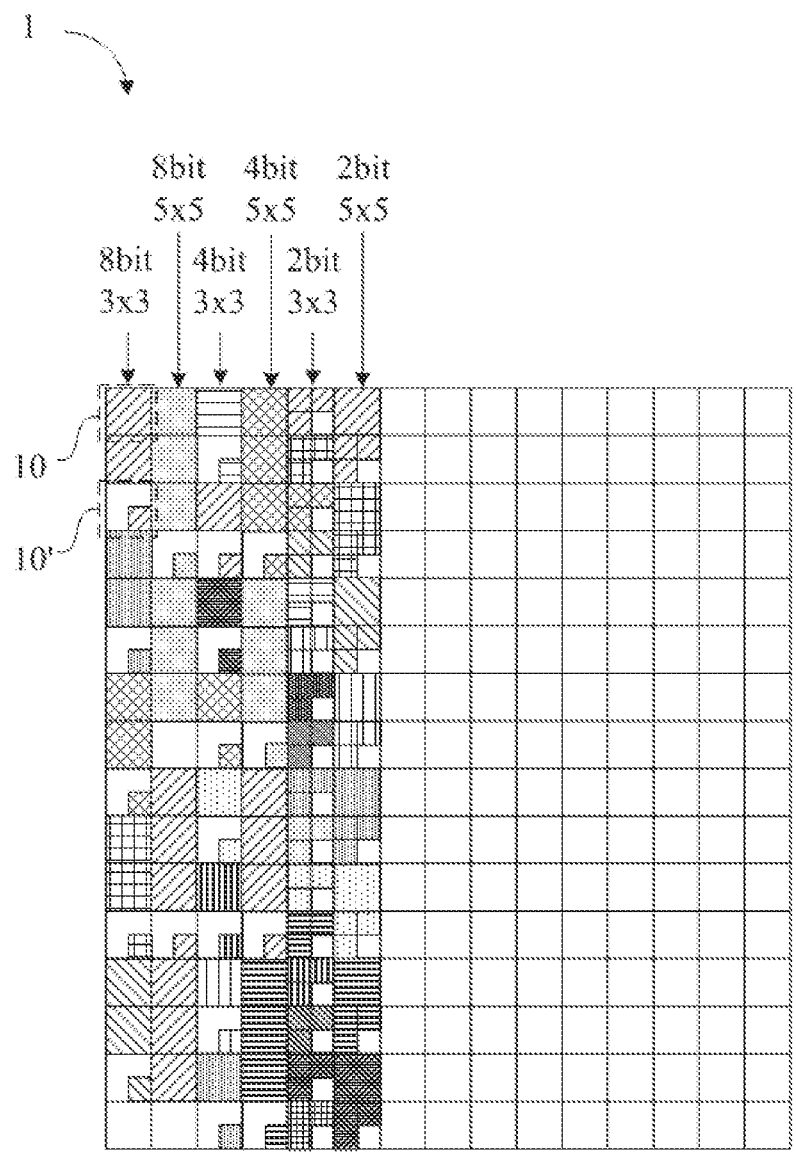
FIG. 2 shows a schematic diagram of a convolution block array for parallel processing of different filter combinations.

Referring to FIG. 2, which shows a schematic diagram of a convolution block array 1 for parallel processing of different filter combinations. The convolution block array 1 includes a plurality of convolution block circuits 10 arranged in a plurality of rows and columns. In the present embodiment, the convolution block array 1 is formed by combining convolution block circuits 10 arranged in 16 rows and 16 columns. However, different arrays may be employed in other embodiments, and are not limited thereto. As shown in FIG. 2, each column of convolution block circuits 10 is connected to each other, for example, via bus, etc. Thus, each column of convolution block circuits 10 is in-line architecture. The term "in-line" refers to the process of passing calculated values to other convolution block circuits 10 of the same column without being stored in an external memory.

It should be noted that multiplexers 120 of the present disclosure are bit configurable multiplier circuits, such that the multiplexers 120 are suitable for performing various convolution operations with different bits of the filter values. Therefore, as shown in FIG. 2, different columns of convolution block circuits 10 can perform different convolution operations in parallel. The combination of the filter size and the bit size of the convolution operation determines a number of convolution block circuits 10 arranged in a line based that perform the convolution operation for one pixel and determines the number of multiplier circuits used by the last convolution block circuit 10. For example, in a case of performing 3×3 filter window involving 8-bit based convolution operation, three convolution block circuits 10 are needed to perform the convolution operation for one pixel, where the last of the convolution block circuits 10 uses only one multiplier circuit. As shown in FIG. 2, the same pattern of each column of convolution block circuits is used to indicate that the convolution block circuits 10 are performing convolution operations for the same pixel, and a blank unpatterned portion indicates the convolution block circuit or the multiplier circuit is idle. Also, in each of column of convolution block circuits, convolution operations for different pixels may be performed in parallel.

As shown in FIG. 2, one or more multiplier circuits in one convolution block circuit 10 are idle, such as the convolution block circuit 10'. For the convolution block circuit 10', the operation of the remaining multiplier circuits becomes meaningless. Therefore, in the present disclosure, the filter values prepared in advance are manipulated to include a value of biasing coefficient. Also, the value of the biasing coefficient can be transmitted to the adder circuit existing in the convolutional block circuit via the remaining multiplier circuit to perform the operation of adding the biasing coefficient. It should be noted that the addition operation of the biasing coefficient performed by which convolution block circuit is determined by the combination of the filter size and the bit size of the convolution operation. The corresponding biasing coefficient is input to the convolution block circuit instead of weight coefficients. The specific addition operation of the biasing coefficient will be detailed later. Moreover, since the convolution block circuit 10 of the present disclosure can support various bit sizes, the operation of adding the biasing coefficient can be performed by the convolution block circuit 10 without using an additional adder circuit disposed outside the convolution block array 1. Therefore, no separate memory access operations are required and no separate hardware is required. According to the present disclosure, by using the convolution block circuit 10, the hardware size in the CNN can be reduced and the operational performance can be improved.

Figure 3:
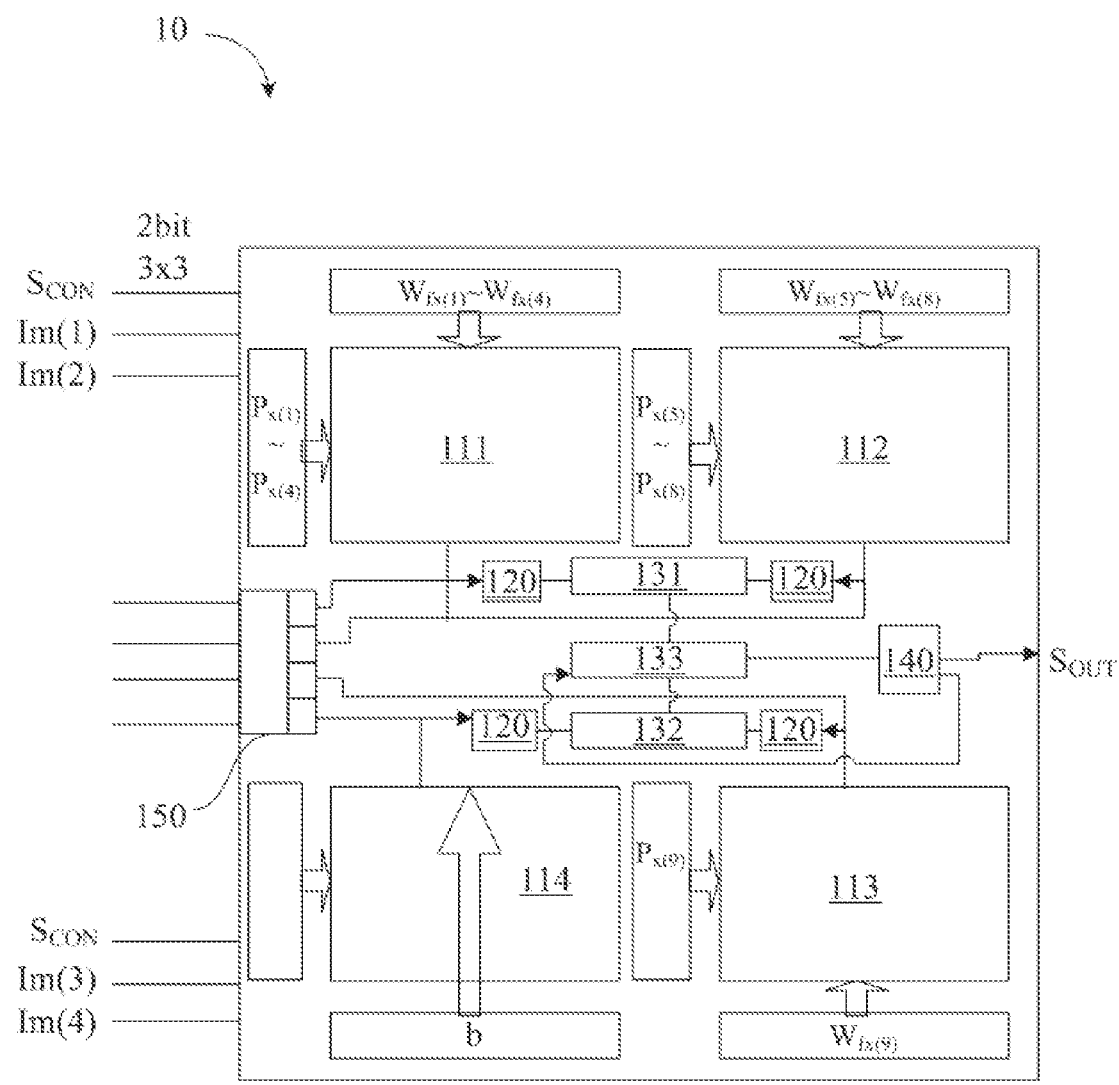
FIG. 3 shows a schematic diagram of a convolution block circuit performing 3×3 filter window involving 2-bit based convolution operation.

Referring to FIG. 3, which shows a schematic diagram of the convolution block circuit 10 performing 3×3 filter window involving 2-bit based convolution operation. In this embodiment, the convolution block circuit 10 requires only one cycle to complete the convolution operation for one pixel. In this cycle, control signals $S_{CON}$ are input to the convolution block circuit 10, the multiplier circuits 111-114 are configured to perform a 2-bit multiplication function. Feature values (i.e., $P_{x(1)}$-$P_{x(9)}$) and filter values (i.e., weight coefficients $W_{fx(1)}$-$W_{fx(9)}$ and a biasing coefficient b) are fed into the convolution block circuit 10, 3×3 convolutions can then be performed, thereby outputting an output signal $S_{OUT}$.

Specifically, as shown in FIG. 3, a first multiplier circuit 111 performs a first partial convolution operation of the feature values $P_{x(1)}$-$P_{x(4)}$ with the weight coefficients $W_{fx(1)}$-$W_{fx(4)}$, a second multiplier circuit 112 performs a second partial convolution operation of the feature values $P_{x(5)}$-$P_{x(8)}$ with the weight coefficients $W_{fx(5)}$-$W_{fx(8)}$, and a third multiplier circuit 113 performs a third partial convolution operation of the feature values $P_{x(9)}$ with the weight coefficients $W_{fx(9)}$. In this embodiment, since all CNN convolution operation data IDs require an odd operation of the multiplier circuits, the convolution block circuit 10 will not use a fourth multiplier circuit 114. That is, the fourth multiplier circuit 114 will not perform any convolution operation, and the corresponding partial convolution operations of the multiplier circuits 111-113 are executed at the same time.

Then, the first multiplier circuit 111 and the second multiplier circuit 112 transmit the results of the corresponding partial convolution operations to the first adder circuit 131, so that the first adder circuit 131 perform an adding operation to add those results from the first multiplier circuit 111 and the second multiplier circuit 112. Moreover, the third multiplier circuit 113 transmits the results of the corresponding partial convolution operation to the second adder circuit 132, and the biasing value b will be directly passes to the second adder circuit 132 via the fourth multiplier circuit 114, such that the second adder circuit 132 will perform another adding operation to add the two values. Then, the added values calculated by first adder circuit 131 and second adder circuit 132 are passed to the block adder circuit 133, which adds these two values, thereby outputting the output signal $S_{OUT}$. It should be understood that the 3×3 filter window involving 2-bit based convolution operation for one pixel can be accomplished by one convolution block circuit 10, that is, the output signal $S_{OUT}$ output from the convolution block circuit 10 is equivalent to a convolution output value of one pixel.

In the present disclosure, if the bit size of the weight coefficients and the bit size of the biasing coefficient are different, the value of the biasing is adjusted to the bit size of the corresponding weight coefficients and can be solved by dividing because the value of the biasing is usually much larger than or equal to the value of the weight coefficients. In this process, the biasing value may cause some errors, but this is not enough to affect the overall CNN operation since most of the CNN hardware implementations are tolerable. If all of operation of convolution is working under same bit precision of input image, biasing value will be used as same bit precision of input image without manipulating of value of it.

Figure 4:
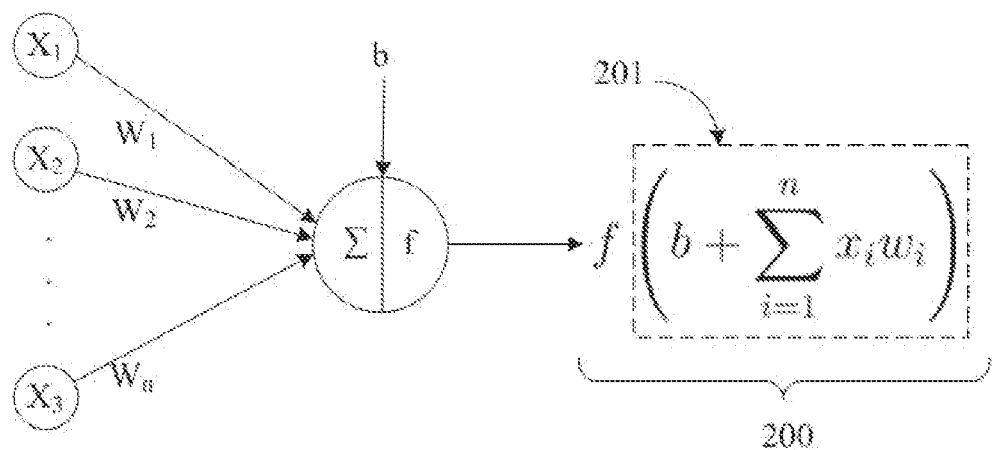
FIG. 4 shows an activation function of CNN.

Referring to FIG. 4, shows an activation function 200 of CNN, where a portion 201 of the function 200 can be obtained by calculation of the convolution block array 1 of the present disclosure. In addition to an activation operation (i.e., symbol "f"), the convolution block array 1 will cover all unit neuron operations 201. The biasing operation will be applied during the final operation for a pixel as described above.

As shown in FIG. 2, depending on the physical location of each convolutional block circuit in a column of the convolution block circuits 10 of the convolution block array 1, the output signal will be fed back to the last of the concatenated convolution block circuits 10. To be specific, referring to FIG. 5, which shows a schematic diagram of signal transmission for performing 3×3 filter window involving 8-bit based convolution operation by a number of the convolution block circuits 10 arranged in a line based. A method of implementing neural network application in the convolution block array 1 includes the following steps. In a step S10, a set of convolution block circuits 10 in a first dimension is assigned to process the 3×3 filter window involving 8-bit based convolution operation of the neural network application. In this embodiment, the convolution operation for one pixel is performed by three convolution block circuits 10. In this case, these three convolution block circuits 10 require two cycles to complete the convolution operation for one pixel. In a first cycle, these three convolution block circuits perform corresponding partial convolution operations with feature values and filter values (including weight coefficients and/or a biasing coefficient b), and then generate partial output signals, respectively. In a second cycle, all of the partial output signals are transmitted to the last of the convolution block circuits 10, and a final addition operation is performed on the last convolution block circuit 10, thereby outputting a convolution output signal representing one pixel. The specific signal transmission and the convolution operation will be detailed below.

Figure 5:
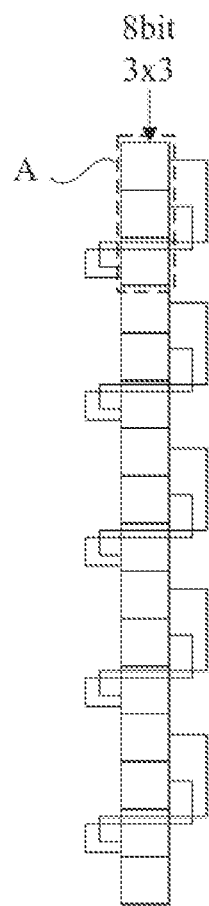
FIG. 5 shows a schematic diagram of signal transmission for performing 3×3 filter window involving 8-bit based convolution operation by a number of the convolution block circuits arranged in a line based.
Figure 6:
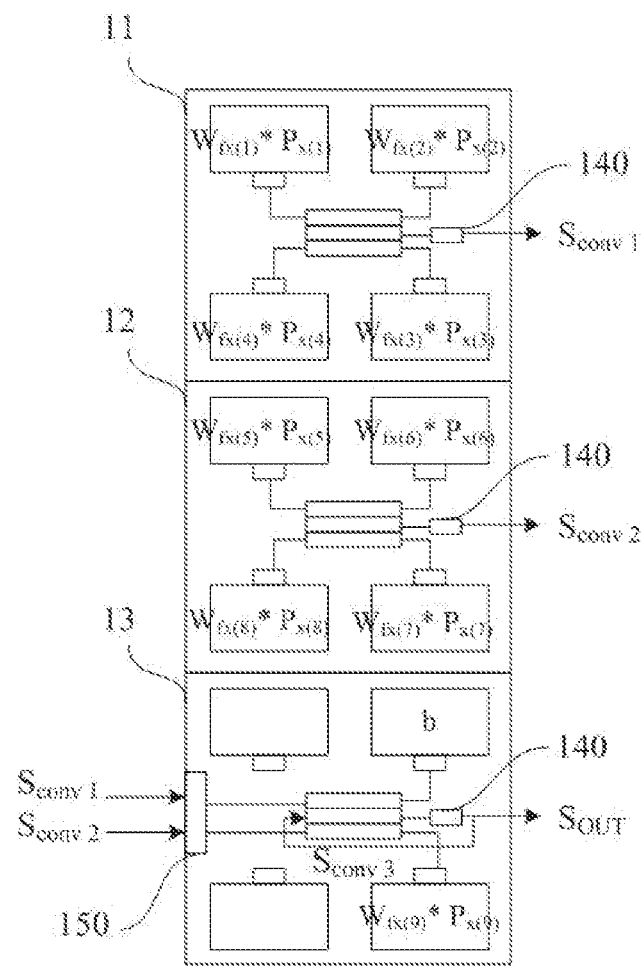
FIG. 6 shows a schematic diagram of the convolution block circuits of portion A of FIG. 5.

Referring to FIG. 6, which shows a schematic diagram of the convolution block circuits 11-13 of portion A of FIG. 5. In the first cycle, a step S20 is performed, and control signals are input to the convolution block circuits 11-13, the multiplier circuits of the convolution block circuits are configured to perform an 8-bit multiplication function. In a step S30, feature values $P_{x(1)}$-$P_{x(4)}$ and filter values (i.e., weight coefficients $W_{fx(1)}$-$W_{fx(4)}$) are fed into the first convolution block 11, feature values $P_{x(5)}$-$P_{x(8)}$ and filter values (i.e., weight coefficients $W_{fx(5)}$-$W_{fx(s)}$) are fed into the second convolution block 12, and feature value $P_{x(9)}$ and filter values (i.e., weight coefficient $W_{fx(9)}$ and a biasing coefficient b) are fed into the third convolution block 13. In this embodiment, since all of CNN convolution operation data ID required odd operation of multiplier circuits, the final convolution block circuit (i.e., the third convolution block circuit 13) will be not used three multiplier circuits except one multiplier circuit. Then, in a step S40, convolution block circuits 11-13 simultaneously perform 3×3 convolutions and generate corresponding partial output signals $S_{conv1}$-$S_{conv3}$. Specifically, in the first cycle, a step S50 is performed, the block adder circuit of the third convolution block 13 performs a first adding operation to add results of a corresponding partial convolution operation from the second convolution adder circuit and a biasing coefficient from the first convolution adder circuit, and then generates a first convolution value (i.e., the partial output signal $S_{conv3}$), wherein the biasing coefficient transmits to the block adder circuit through an idle multiplier circuit of the four multiplier circuits. Alternatively, the partial output signals $S_{conv1}$-$S_{conv3}$ may be temporarily stored in the respective latches 140.

As shown in FIG. 6, in the second cycle, the first and second convolution block circuits 11-12 transmit the respective partial output signals $S_{conv1}$-$S_{conv2}$ to the path controller 150 of the third convolution block 13. The corresponding paths of the path controller 150 are enabled, and the partial output signals $S_{conv1}$-$S_{conv2}$ can be transmitted to either the first adder circuit or the second adder circuit of the third convolution block 13. At the same time, the third convolution block 13 feeds the partial output signal $S_{conv3}$ back to its block adder circuit. Then, a step S60 is performed, he block adder circuit of the third convolution block 13 receives the first convolution value (i.e., the partial output signal $S_{conv3}$) and other partial output signals $S_{conv1}$-$S_{conv2}$ from upstream convolution block circuits 11-12, so as to performs a second adding operation to add all of the partial output signals $S_{conv1}$-$S_{conv3}$, thereby outputting a complete convolution output signal $S_{OUT}$ representing one pixel.

It should be understood that, as shown in FIG. 2, the convolution operations of one pixel with respect to other embodiments (e.g., 5×5 filter window involving 2-bit based convolution operation, 3×3 filter window involving 4-bit based convolution operation, 5×5 filter window involving 4-bit based convolution operation, etc.) are also implemented by two cycles, which will not be described herein.

Figure 7:
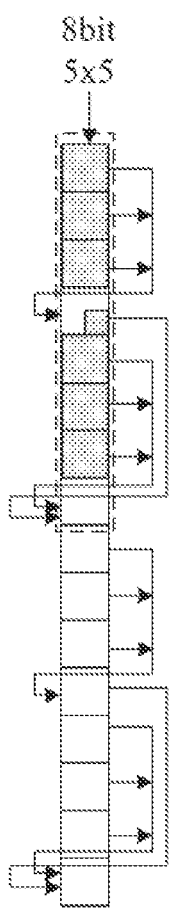
FIG. 7 shows a schematic diagram of signal transmission for performing 5×5 filter window involving 8-bit based convolution operation by a number of the convolution block circuits arranged in a line based.

Referring to FIG. 7, which shows a schematic diagram of signal transmission for performing 5×5 filter window involving 8-bit based convolution operation by a number of the convolution block circuits arranged in a line based. The convolution operation for one pixel is performed by eight convolution block circuits. In this case, these eight convolution block circuits require three cycles to complete the convolution operation for one pixel. In a first cycle, the first to seventh convolution block circuits perform corresponding partial convolution operations with feature values and filter values (including weight coefficients and/or a biasing coefficient b), and then generate partial output signals, respectively. Preferably, the biasing coefficient b is applied to the fourth convolution block circuit.

As shown in FIG. 7, in a second cycle, the first to third convolution block circuits transmit the respective partial output signals to the path controller of the fourth convolution block circuit. The corresponding paths of the path controller are enabled, and the partial output signals can be transmitted to the adder circuits of the fourth convolution block circuit. At the same time, the fourth convolution block circuit feeds the partial output signal back to its block adder circuit. Then, all of the partial output signals are added by the block adder circuit of the fourth convolution block circuit, thereby generating another partial output signal.

As shown in FIG. 7, in a third cycle, the fourth to seventh convolution block circuits transmit the respective partial output signals to the path controller of the eighth convolution block circuit. The corresponding paths of the path controller are enabled, and the partial output signals can be transmitted to the adder circuits of the eighth convolution block circuit. Then, all of the partial output signals are added by the block adder circuit of the eighth convolution block circuit, thereby outputting a complete convolution output signal representing one pixel.

In summary, when the CNN algorithm is implemented in hardware, even if the CNN algorithm is not equipped with any hardware for biasing, the filter size of all two-dimensional convolutions is odd. Therefore, the present disclosure provides a convolution block circuit to be composed of four multiplier circuits. The result of the multiplication of the remaining pixel is input to the unused adder circuit input of the last portion of the necessary convolution block according combination of the filter size and the bit size of the convolution operation. Finally, by giving the biasing value to the empty filter input, by this design, we can get the result of running all the successes except activation. This saves hardware resources and eliminates the need for separate memory operations, thereby improving performance.

The above descriptions are merely preferable embodiments of the present disclosure. Any modification or replacement made by those skilled in the art without departing from the principle of the present disclosure should fall within the protection scope of the present disclosure.

What is claimed is:

1. A convolution block array for implementing a neural network application, comprising:
    a plurality of convolution block circuits configured to process a convolution operation of the neural network application, wherein each of the convolution block circuits comprising:
    a plurality of multiplier circuits configured to perform the convolution operation; and
    at least one adder circuit connected to the plurality of multiplier circuits and configured to perform an adding operation of results of the convolution operation and generate an output signal;
    wherein at least one of the convolution block circuits comprises at least an idle multiplier circuit and a convolution operation multiplier circuit and the one of the convolution block circuits is configured to concurrently perform a biasing operation and the convolution operation of the neural network application, such that the idle multiplier circuit performs the biasing operation and the convolution operation multiplier circuit performs the convolution operation, wherein a biasing coefficient passes to the at least one adder circuit through the idle multiplier circuit of the plurality of multiplier circuits, and the convolution operation is executed by multiplying feature values by weight coefficients and adding the biasing coefficient.

2. The convolution block array as claimed in claim 1, wherein each of the convolution block circuits comprises four multiplier circuits, a first convolution adder circuit, a second convolution adder circuit, and a block adder circuit;
    wherein two multiplier circuits of the four multiplier circuits are connected to the first convolution adder circuit, and another two multiplier circuits of the four multiplier circuits are connected to the second convolution adder circuit, and
    the block adder circuit is connected to the first convolution adder circuit and the second convolution adder circuit.

3. The convolution block array as claimed in claim 1, wherein the convolution block further comprises a latch connected to the at least one adder circuit and also connected to at least one downstream convolution block circuit;
    wherein the latch is configured to transmit the output signal to the at least one downstream convolution block circuit or fed the output signal back to the at least one adder circuit.

4. The convolution block array as claimed in claim 3, wherein the convolution block array further comprises:
    a plurality of multiplexers connected to the plurality of multiplier circuits respectively, wherein the multiplier circuits are connected to the at least one adder circuit via respective multiplexer; and
    a path controller connected to the plurality of multiplexers and also connected to at least one upstream convolution block circuit, wherein when a corresponding path of the path controller is enabled, an output signal from the at least one upstream convolution block circuit transmits to the at least one adder circuit via the path controller.

5. A method of implementing neural network application in a convolution block array, wherein the convolution block array comprising a plurality of convolution block circuits, and each of the convolution block circuits comprises a plurality of multiplier circuits and at least one adder circuit, and the method comprises:
    S10, assigning a set of convolution block circuits in a first dimension to process a convolution operation of the neural network application;
    S20, inputting a control signal to the set of convolution block circuits for controlling the set of convolution block circuits to perform M×M filter window involving N-bit based convolution operation, wherein M is an odd number and N is an integer greater than one;
    S30, inputting feature values and filter values to the set of convolution block circuits;
    S40, performing an N-bit multiplication function with the feature values and the filter values corresponding values of input images by the multiplier circuits of the convolution block circuit;
    S50, adding results from the multiplier circuits by the at least one adder circuit; and
    S60, generate a convolution output signal;
    wherein a last one of the set of the convolution block circuits comprises at least an idle multiplier circuit and a convolution operation multiplier circuit and the last one of the convolution block circuits is configured to concurrently perform a biasing operation and the convolution operation of the neural network application, such that the idle multiplier circuit performs the biasing operation and the convolution operation multiplier circuit performs the convolution operation, wherein the filter values of one pixel comprise weight coefficients and a biasing coefficient, and in the last convolution block circuit for performing convolution operation of each pixel, the biasing coefficient passes to the at least one adder circuit through the idle multiplier circuit of the plurality of multiplier circuits.

6. The method as claimed in claim 5, wherein the step S10 comprises: according to a combination of the M×M filter window and the N-bit of the convolution operation, determine use a number of the convolution block circuits for performing the convolution operation of one pixel of the convolution block circuits, and the number of the convolution block circuits arranged in a line based.

7. The method as claimed in claim 5, wherein after the step S50, the method comprises:

S51, adding the results by the at least one adder circuit of each convolution block circuit to generate a partial output signal;

S52, transmitting all of partial output signals to the last convolution block circuit; and S53, adding the all of partial output signals by the at least one adder circuit of the last convolution block circuit, and generating the convolution output signal representing one pixel.

8. The method as claimed in claim 5, wherein each of the convolution block circuits comprises a latch connected to the at least one adder circuit and also connected to the last convolution block circuit, and wherein after the step S51, the last convolution block circuit temporarily stores the partial output signal in the latch, and then in the step S52, the last convolution block circuit feeds the partial output signal back to its the at least one adder circuit.

9. A convolution block circuit, comprising:
four multiplier circuits configured to perform a M×M filter window involving N-bit based convolution operation;
a first convolution adder circuit connected to two multiplier circuits of the four multiplier circuits and configured to add results of the convolution operation from the two multiplier circuits;
a second convolution adder circuit connected to another two multiplier circuits of the four multiplier circuits and configured to add results of the convolution operation from the two multiplier circuits;
a block adder circuit connected to the first convolution adder circuit and the second convolution adder circuit and configured to perform a first adding operation and a second adding operation, wherein in the first adding operation, the block adder circuit adds results of partial convolution operations from the first convolution adder circuit and the second convolution adder circuit and a biasing coefficient, and generates a first convolution value, wherein the biasing coefficient transmits to the block adder circuit through an idle multiplier circuit of the four multiplier circuits; and
a latch connected to the block adder circuit configured to fed the first convolution value back to the block adder circuit;
wherein in response to the block adder circuit receive the first convolution value and other partial output signals from upstream convolution block circuits, the block adder circuit performs the second adding operation to add the first convolution value and the other partial output signals, and generates a convolution output signal, wherein the convolution block circuit defines a plurality of the four multiplier circuits as convolution operation multiplier circuits and is configured to concurrently perform a biasing operation and the convolution operation, such that the idle multiplier circuit performs the biasing operation and the convolution operation multiplier circuits perform the convolution operation.

\* \* \* \* \*